Figure 3:
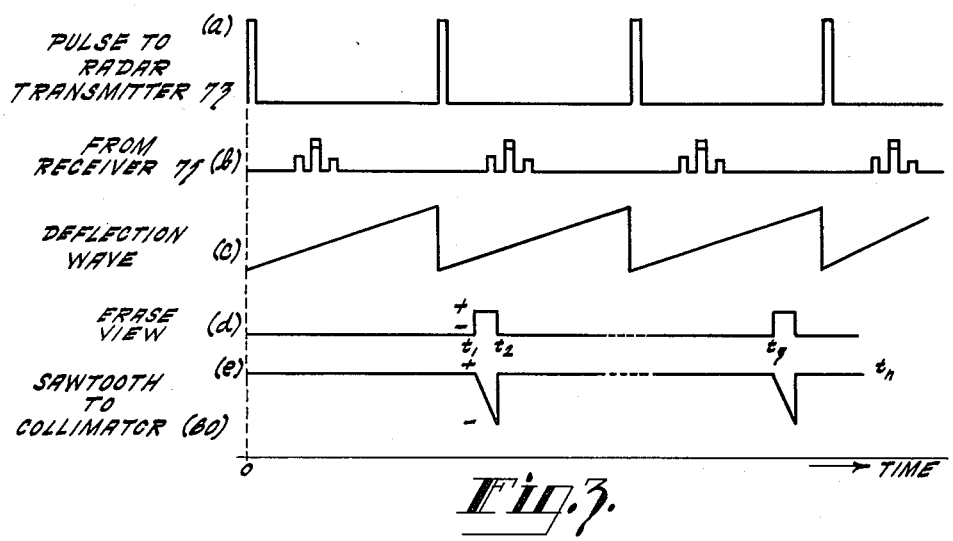

Nov. 14, 1961
C. E. REEDER ET AL
3,009,145
DIRECT-VIEW ELECTRICAL STORAGE TUBE
AND ERASING SYSTEM THEREFOR
Filed Nov. 21, 1957
2 Sheets-Sheet 1
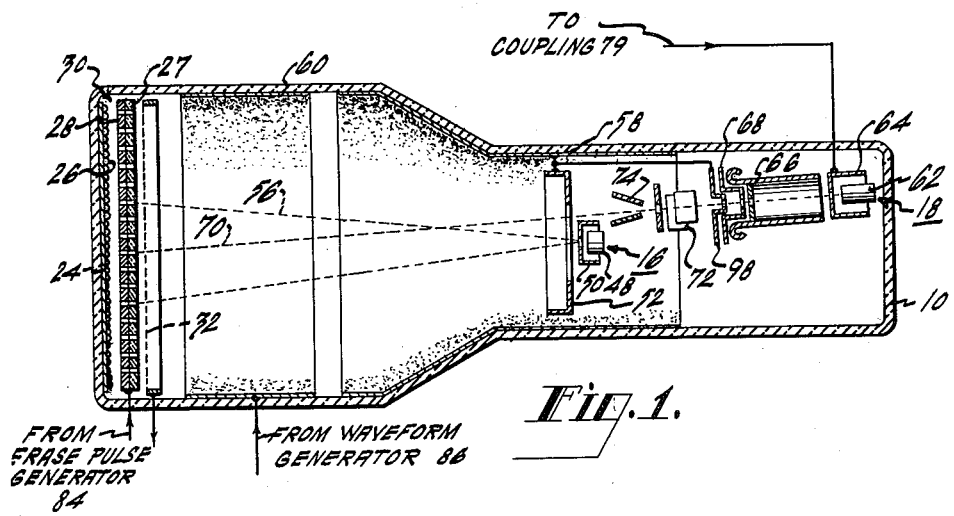
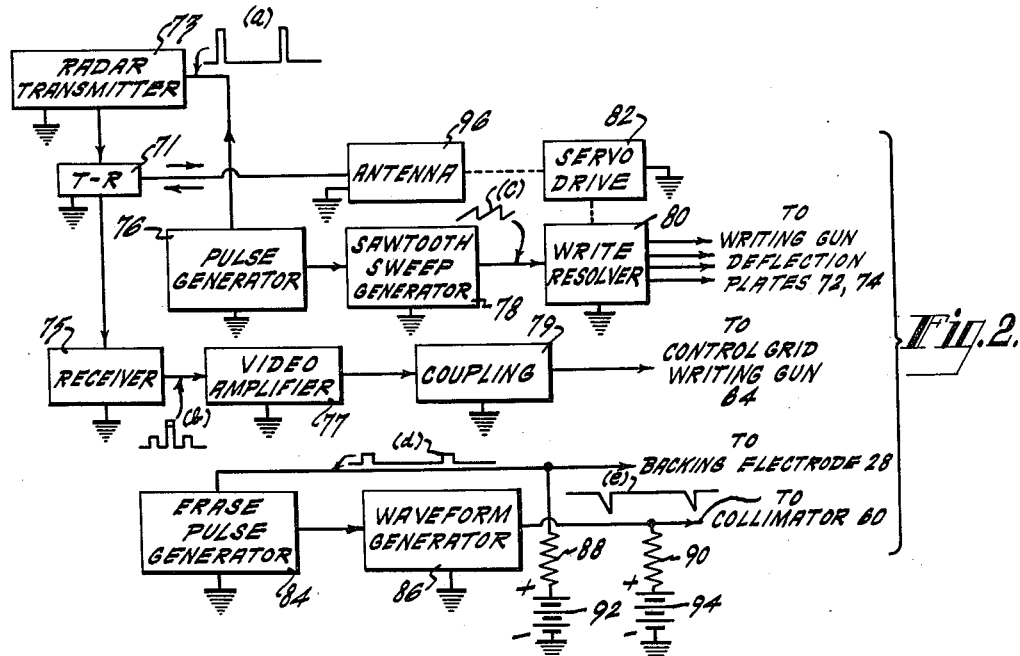
INVENTORS
CLAUDE E. REEDER &
HOWARD M. SCOTT
BY
ATTORNEY

INVENTORS
CLAUDE E. REEDER &
HOWARD M. SCOTT
BY
ATTORNEY 3,009,145
Patented Nov. 14, 1961

3,009,145
DIRECT-VIEW ELECTRICAL STORAGE TUBE AND ERASING SYSTEM THEREFOR
Claude E. Reeder, Pennsauken, N.J., and Howard M. Scott, Philadelphia, Pa., assignors to Radio Corporation of America, a corporation of Delaware
Filed Nov. 21, 1957, Ser. No. 697,897
17 Claims. (Cl. 343—11)

This invention relates generally to signal storage and display and particularly to improved methods and means for employing a direct view type of electrical storage tube for storing and displaying signal intelligence.

The direct view storage tube as presently known may be used in connection with radar systems, ground-to-air private line communication systems, and for related purposes. The direct view storage tube combines both the features of signal storage and signal display thus eliminating the requirements for one or more electrical storage tubes in combination with a separate display tube. Furthermore, the direct view storage tube provides an excellent high brightness radar display which can be viewed in normal daylight, making it ideally suited to airborne display applications. In addition to high brightness, the direct view storage tube has long term storage properties and controllable decay characteristics.

However, in employing the direct view storage tube as presently known, the signal intelligence shown near the center of a radar PPI display may appear indistinct as a result of intense signal and ground clutter. On the other hand the intensity of signal intelligence displayed at the periphery of a radar PPI display is comparatively weak, and maintained for a comparatively short period of time.

An object of the present invention is to provide improved methods and means for storing and displaying signal intelligence. Another object of the invention is to provide improved methods and means for utilizing the direct view storage tube.

Another object of the invention is to provide improved methods and means for erasing data stored and displayed by the direct view storage tube.

A further object is to provide a means of controlling the storage time of stored information on a direct view storage tube target surface, said storage time varying with respect to the distance of said stored information from the center of the display area.

A further object is to provide for a long period of storage time for signals near the edge of a radar P.P.I. display.

A still further object is to provide a simple means of suppressing ground clutter in a radar P.P.I. display.

According to the present invention improved methods and means are provided for erasing data stored in the direct view storage tube. In a preferred embodiment of the invention a direct view storage tube is used in which the tube structure contains a writing gun assembly, a viewing-erasing gun assembly, a collimator electrode, a fluorescent screen, and a target assembly which includes a storage grid and a backing electrode.

The writing gun utilizes electrostatic focus and produces an electron beam which is electrostatically deflected by two sets of deflecting electrodes. The electron beam so produced is a well-defined focused beam having exceptionally small effective area at the storage grid. Signal intelligence modulates the electron beam during deflection, and a charge pattern corresponding to the signal input is written on the insulating surface of the storage grid. The viewing gun produces a low-velocity electron stream which continuously floods the storage grid controlling the storage function. The storage grid serves to control the transmission of the flooding viewing beam so that stored information on the storage grid can be displayed on the screen. Those electrons that pass through the storage grid are accelerated to the phosphor to reproduce the charge pattern in the form of a bright display.

Erasure previously has been achieved by applying a positive pulse or series of pulses between the viewing gun cathode and the backing-electrode. The rate of erasure was controllable by adjustment of the duty cycle of the erase pulse. This method erases the entire area of the storage grid simultaneously.

The instant invention achieves selectivity in area erasure by applying an appropriate waveform to the collimator electrode of the direct view storage tube. The application of this waveform to the collimator effectively changes the area covered by the erasing beam. If the waveform is synchronous with the erasing pulse, an emphasis of erasure near the center of the display may be obtained. Thus, the stronger signals seen near the center of the PPI display can be erased more rapidly, suppressing ground clutter and like effects, whereas the storage time of the weaker signal near the periphery is lengthened to permit an integrated presentation of the target.

Figure 4:
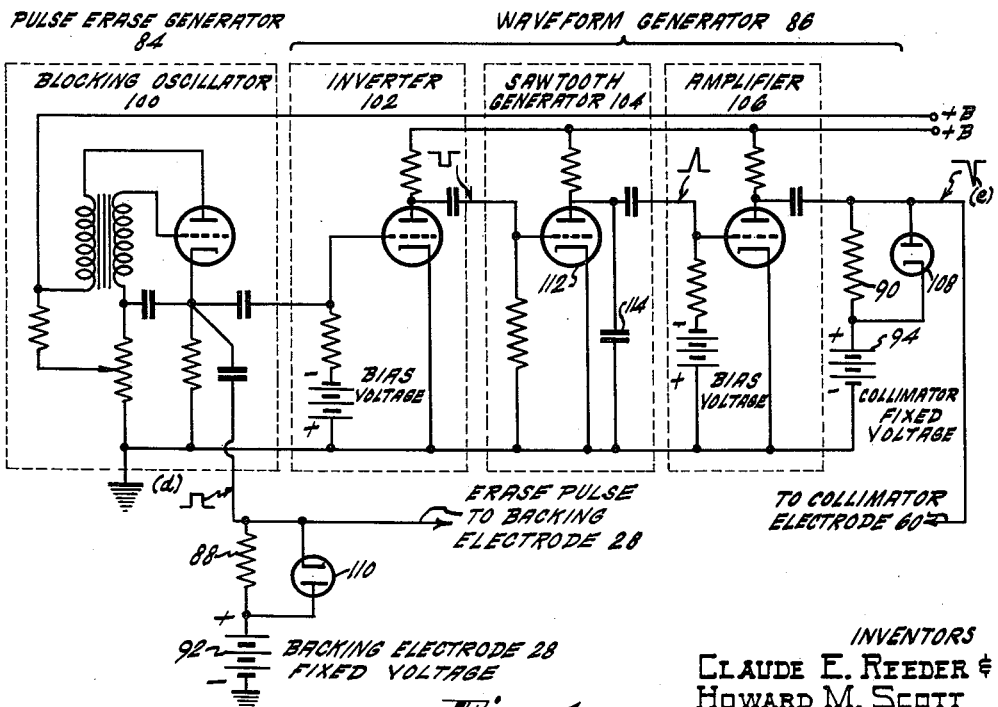

The invention will be described in greater detail with reference to the accompanying drawing in which FIGURE 1 is a schematic illustration of a direct view storage tube; FIGURE 2 is a block diagram of a radar system in which one embodiment of the invention is incorporated; FIGURE 3 is a group of graphs showing time relationship between different functions in the system of FIGURE 2; and FIGURE 4 is a circuit diagram of the erasing system.

In the several figures corresponding parts and graphs are indicated by similar reference characters.

*Storage tube structure*

Referring to FIGURE 1, a two-gun cathode ray tube is shown using a P–1 phosphor screen 26 on the viewed surface and having a target assembly 30 interposed between the phosphor screen 26 and the cathode ray guns 16 and 18. The phosphor material 26 is bonded to a transparent conductive film 24 formed of a metal or metallic compound such as tin oxide.

The target assembly 30 consists of a very thin deposit of excellent insulating material 27 such as a film of vitreous silica or magnesium fluoride of the order of several microns in thickness which covers the gun side of the framework of a fine metallic mesh 28. The deposit leaves the size of the openings in the mesh 28 essentially unchanged. In effect the storage grid 27 consists of a multiplicity of storage elements, each capacitively coupled to the mesh 28 which serves as the backing-electrode.

There is also a collector electrode 32 located between the target assembly 30 and the cathode ray guns 16 and 18. The collector electrode 32 consists of a fine metal mesh supported by a metal band. The collector electrode 32 serves to accelerate electrons in the viewing flood beam and to collect secondary electrons emanating from the target 30. The collector electrode 32 also forms part of the electrostatic lens structure which causes electrons from the viewing beam 56 to approach the target at normal incidence.

The target assembly 30, the collector electrode 32, and the phosphor screen 26 are all close spaced and parallel.

The viewing gun 16 comprises a cathode electrode 48, a control electrode 50, and an accelerating electrode 52 mounted successively along the axis of the gun 16 toward the phosphor screen 26. During the tube operation, these electrodes are maintained at appropriate voltages to form the electron emission from the viewing gun cathode 48 into a wide beam or spray of electrons 56. The inner surface of the evacuated envelope 10 has applied thereto a conductive coating 58 of colloidal graphite or tin oxide which coating may be maintained at the same positive potential as the accelerating electrode 52. A second conductive wall coating 60 extends from a point spaced from but adjacent coating 58 over the bulb-wall interior as shown in FIGURE 1. This coating is at a potential different from that of coating 58 and thus provides a collimating electron lens to align the low-velocity electrons of the spray beam 56 so that the electrons will approach the storage grid 27 in paths perpendicular to the plane of the storage grid.

The writing electron gun 18 comprises a cathode electrode 62, a control electrode 64 and, successively spaced toward the target, a first accelerating electrode 66 and a second accelerating electrode 68. The wall coating 58 extends to the structure of the writing gun and connects to a third accelerating electrode 98 for forming the electrons of gun 18 into a sharply defined and focused beam 70.

For a particular application of the instant invention refer to FIGURE 2, which is a block diagram for a P.P.I. display on a direct view storage tube using flood erasure with area selectivity.

In the radar system illustrated, which is well known in the art, a pulse generator 76 triggers a sawtooth sweep generator 78 which passes a sawtooth waveform through a sine-cosine resolver 80 to the fixed electrostatic deflection plates 72 and 74 of the writing gun. The resolver 80 is a variocoupler or a sine-cosine potentiometer that, when excited by a given waveform, produces two components of the same waveform but proportional respectively to the sine and the cosine of the orientation angle of the resolver 80.

At each trigger pulse produced by the pulse generator 76, a linear time-base sweep is started which moves the cathode ray writing beam 70 from the center of the display tube to the edge in a direction corresponding to the direction assumed by the antenna 96. The range sweep is rotated about the range origin indicated at the center of the tube in synchronism with the azimuthal scanning of the antenna 96. Synchronization of antenna scanning and the display sweep is accomplished by means of a servo drive 82.

At the start of each cycle and simultaneously with the firing of the sweep generator 78, the pulse generator 76 triggers the radar transmitter 73 which transmits pulsed signals through the T—R switch 71 to the rotating antenna 96, and at the same time disconnects the radar receiver 75. After the transmission of the pulse, the antenna 96 picks up echoes and sends them to the radar receiver 75 through the T—R switch 71. The echo signals are amplified by the video amplifier 77 and the output signals are passed through a coupling 79 to the control grid 64 of the writing gun 18.

Tube operation

To prepare the target assembly 30 for storing a charge pattern on the storage grid 27, it is necessary to establish a uniform potential thereover. With the viewing gun 16 turned on, the electrons of the spray beam 56 pass through the collector electrode 32 and are decelerated to near zero velocity at the storage grid 27. Initially, the low velocity electrons land on the storage grid 27 and charge the grid to the same potential as that of the viewing-gun cathode 48, zero potential.

With the storage grid 27 at zero potential, the spray beam electrons 56 will not land on the grid. Most of them are accelerated through the grid 27 and the backing-electrode 28 by the positive high-potential field of the phosphor screen 26. They strike the phosphor 26 and cause it to fluoresce brightly over its entire area.

Writing

The writing function is performed by the writing cathode ray gun 18 whose cathode 62 is operated at about 1500 volts negative with respect to ground. A sharply defined and focused beam 70 is produced which may be deflected by pairs of horizontal and vertical deflection plates 72 and 74 to scan the surface of the storage grid 27. Deflection signals are supplied to plates 72 and 74 by resolver 80, shown in block diagram, FIGURE 2. The resolver may be of the type found on page 285, Components Handbook, by Blackburn, MIT series 1949 edition, volume 17.

Electrons from the writing gun 18 which strike the storage grid 27 cause a greater number of secondary electrons to be emitted from the grid than are actually in the incident beam 70. The result is such that these areas of the storage grid 27 which are struck by the writing beam electrons are made positive with respect to the surrounding areas of the grid. Input signals are applied to the control grid 64 of the writing gun 18 while the writing beam 70, in scanning, builds up a potential pattern on the storage grid 27 due to secondary emission and, in addition, bombardment-induced conductivity. By proper deflection and intensity modulation of the writing beam 70 by the input signals as the target 30 is scanned, a charge pattern can be produced on the storage grid 27 which corresponds to the image pattern of the writing beam 70. The charging of the storage grid 27 is regulated by control of the number of secondary electrons leaving the grid as a result of controlling the field between storage grid 27 and collector 32.

This charge pattern controls the transmission of the collimated viewing beam electrons through the grid 27, which are then accelerated to about 5000 volts in the space between the storage grid 27 and the phosphor screen 26. The potential of any storage element of the grid 27 determines the number of viewing-beam electrons passing through the storage grid 27 in the immediate vicinity of that element. When the potential is such as to allow passage of electrons, these electrons are accelerated and strike the phosphor screen 26 directly opposite the storage element. As a result, they produce a luminescent spot having a brightness which is directly proportional to their density and velocity.

The viewing operation which is continuous, except for the pulsed periods of erasing operation, does not change the potential of the storage elements and therefore a charge pattern established by the writing gun 18 on the storage grid 27 produces a corresponding visible pattern on the phosphor screen 26 which may be observed for as long as a minute, for example, after writing has ceased.

Viewing

The viewing gun 16 provides a flood beam of electrons 56 which completely illuminates the phosphor screen 26. These electrons approach the storage grid 27 at extremely low velocities. They pass through the grid 27 at those areas which have been made positive by the writing beam 70 and are repelled to the collector screen 32 at those areas which contain no written information. Those electrons that pass through the storage grid 27 are accelerated through a potential difference of about 5 kv. to the phosphor screen 26, and thus reproduce the charge pattern in the form of a bright display.

Viewing duration of the display after the writing has ceased is limited by the presence of positive ions produced by collision of electrons in the viewing beam 56 with residual traces of gas in the region between the phosphor screen 26 and the collector electrode 32. These positive ions are attracted to the most negative elements of the storage grid 27. On landing, the ions cause the storage elements to assume a less negative charge and thus to increase the flow of viewing-beam electrons to the phosphor screen 26. Thus, the limit of viewing duration is determined by loss of contrast in the viewed pattern rather than by a decay of brightness.

Extended viewing duration may be obtained by reducing the viewing beam current and thus decreasing the number of positive ions which land on the storage grid. This, however, reduces the screen brightness.

Erasure

According to the instant invention, a modification of the area erase method is employed wherein the viewing gun is time-shared between viewing and erasing functions.

During the viewing period, backing-electrode 28 is maintained at a positive potential of the order of 5 volts positive relative to ground, for example, by means of a connection through load resistor 88, (FIG. 2), to the positive terminal of a battery 92, which has its negative terminal connected to ground.

To erase the stored pattern, a positive pulse or series of pulses of sufficient amplitude and duration is applied to the backing electrode 28 by means of an erasing pulse generator 84 which periodically generates positive pulses across load resistor 88. The magnitude of the pulses generated raises the positive potential of the backing-electrode 28. As a result, viewing-beam electrons 56 will land and obliterate any charge pattern by charging the storage grid 27 uniformly negative to viewing cathode potential.

The erase process is controlled so that each positive pulse applied to the backing-electrode 28 causes a fractional portion of the overall stored electrical charge pattern to be erased. The erasing speed with a rectangular pulse of given amplitude is determined by the duration of the positive pulse and the pulse repetition rate, and may be controlled by varying either or both of these parameters. An erasing pulse with a repetition rate which is faster than the flicker rate that can be detected by the eye is generally desirable. The repetition rate of the erase pulse may be either synchronous with other repetition rates used in the system or completely non-synchronous.

Selectivity in area erasure is obtained by applying the erasing flood beam to the central area of the display for a longer period than to the periphery of the display. This selectivity is achieved by applying an appropriate waveform, such as a sawtooth waveform, to the collimator electrode 69 of the direct-view storage tube. The sawtooth wave form is produced by the waveform generator 86 and synchronized with the erasing pulse generated by pulse generator 84.

The waveform generator 86 is connected to the collimator 60 through load resistor 90 which provides the load impedance for the generator 86 to develop the pulse signal. The load resistor 90 is connected to the positive terminal of a battery 94 which maintains the potential of the collimator at 80 to 100 volts positive with respect to ground, by way of example, during the viewing operation. The application of a negative going sawtooth signal to the collimator 60 lowers the potential of the collimator in the order of 100 volts. As a result, the erasing flooding beam is caused to contract as a function of the decreasing potential of the collimator 60.

Referring to FIGURE 3, the erasing pulse is shown as applied at times $t_1$, $t_3$ ... $t_n$. The duration of the erase pulse is from $t_1$ to $t_2$, and the sawtooth waveform is shaped to go from zero to its negative maximum during the period $t_1$–$t_2$. As a result, the voltage on the collimator electrode is driven more negative causing the erasing flood beam to contract radially. By "closing" the erasing flood beam in this manner, erasing electrons land at the central areas for the duration of the erase pulse $t_1$–$t_2$, whereas at the periphery of the target 27 the erasing electrons land for only a fraction of the time of the erase pulse. The degree of erasure is therefore a function of the radial distance of the target element from the center of the display.

Referring to FIGURE 4, a circuit diagram of a typical erasing system is shown.

A blocking oscillator 100 generates erasing pulses of a desired duration, amplitude, and repetition rate. These pulses are fed to the backing-electrode 28 of the direct view storage tube, and also to an inverter 102.

The inverted signal is applied to a sawtooth generator 104 which includes a normally conducting tube 112.

When the negative pulse is applied, the tube 112 is cut off and held biased for the duration of the negative pulse. During the cutoff interval, the sawtooth generator capacitor 114 is charged so that a sawtooth waveform results. At the end of the applied pulse, the tube 112 becomes conducting again and the capacitor 114 discharges through the tube 112.

The resulting sawtooth wave is then fed through the amplifier 106 which amplifies and inverts the sawtooth wave to a negative-going signal. The negative-going sawtooth wave is applied to the collimator electrode 60 of the direct view storage tube, thus causing the desired effect of closing the erasing beam.

Clamping diodes 108 and 110 are used as D.C. restorers which maintain the amplitude of the signal relative to a reference level of potential.

The shape, amplitude, and polarity of the waveform may be adjusted to provide an erasing flood beam which can "open" or "close," and which controls the degree and rate of erasure.

In operation, typical voltages applied to the electrodes of the above tube are as follows:

Writing Gun 18:         Potential relative to ground
    Cathode 62_____ 1500 volts negative.
    Control grid 64_____ 1560 volts negative.
    1st accelerating electrode 66_ 50 volts positive.
    2nd focus electrode 68_____ 1000 volts negative.
    3rd accelerating electrode 58_ 50 volts positive.
Viewing Gun 16:
    Cathode 48_____ Zero.
    Control grid 50_____ 50 volts negative.
    Accelerating electrode 52___ 50 volts positive.
Other Electrodes:
    Collector 32_____ 150 volts positive.
    Backing-electrode 28—writing, viewing_____ 5 volts positive.
    Backing-electrode 28—erasing _____ 15 volts positive.
    Screen conductor 24_____ 5000 volts positive.
    Collimator 60_____ 80–100 volts positive.

The above tabulated voltages are particularly suitable for the RCA display storage tube 6866. However, the instant invention is not limited in application to any specific direct view storage tube, but is readily adaptable for use in generally any direct view storage tube in which erasure of stored data is necessary.

The invention as incorporated in the embodiment herein described, affords the advantage of suppressing ground clutter in a radar P.P.I. display and, in addition provides signal integration of comparatively weak signals.

What is claimed is:

1. In a storage tube of the type containing a signal storage electrode, the method of cyclically writing and selectively erasing electrical information which comprises recurrently writing electrical information on a signal storage electrode, producing a flood beam which may be modulated by said written electrical information on said signal storage electrode, generating electrical pulses and utilizing said generated pulses to pulse said storage electrode thus increasing the intensity of said flood beam to provide erasure of said written electrical information, generating a signal during said generation of electrical pulses, and varying the configuration of said erasing flood beam as a function of said signal.

2. In a storage tube of the type containing a signal storage electrode, the method of cyclically writing and selectively erasing electrical information which comprises recurrently writing electrical information on a signal storage electrode, producing a flood beam which may be modulated by said written electrical information on said signal storage electrode, generating electrical pulses and utilizing said generated pulses to pulse said storage electrode thus increasing the intensity of said flood beam to provide erasure of said written electrical information, generating a periodic signal synchronous with said generated pulses, and varying the configuration of said erasing flood beam as a function of said signal.

3. A signal storage tube system comprising an electrical storage tube containing a charge storage member, means for periodically writing electrical information on said charge storage member, means for generating an electron beam for flooding said storage member, means for pulsing said storage member at intervals to increase the velocity of the electrons in said erasing flood beam to thereby erase said written electrical information, and means to narrow said erasing flood beam continuously during said intervals of pulsing said storage member.

4. A signal storage tube system comprising an electrical storage tube containing a charge storage member, means for periodically writing electrical data on said charge storage member, means for generating an electron flood beam, means to collimate said electron flood beam as said beam approaches said charge storage member, means for periodically changing the potential of said storage member to effect erasure of the charge by the flood beam, and means for varying the potential of said collimating means synchronously with said potential changes of said storage member to cause said erasing electron flood beam to change in diameter during said erasure.

5. A signal storage tube system comprising an electrical storage tube containing a charge storage member, a viewing surface adjacent one side of said charge storage member, means for generating an electron beam for flooding the other side of said charge storage member, means for deflecting a sharply defined and focused beam across said storage member, connection means for a source of signals for modulating said focused beam during said deflection to write an electrical charge pattern on said charge storage member, means for reproducing said charge pattern on said viewing screen, means for periodically increasing the intensity of said flooding beam for erasing the charge pattern on said charge storage member, and means for varying the configuration of said flood beam during and synchronously with said erasure.

6. A signal storage tube system comprising an electrical storage tube containing a charge storage member, a viewing surface adjacent one side of said charge storage member, means for generating an electron beam for flooding the other side of said charge storage member, means for deflecting a sharply defined and focused beam across said storage member, connection means for a source of signals for modulating said focused beam during said deflection to write an electrical charge pattern on said charge storage member, means for reproducing said charge pattern on said viewing screen, means to increase for a certain period the intensity of said flooding beam for erasing the charge pattern on said charge storage member, and means for limiting the flood beam during said erasure and synchronously therewith to a smaller area than the area of the entire display.

7. A signal storage tube system comprising an electrical storage tube containing a charge storage member, a viewing surface adjacent one side of said charge storage member, means for generating an electron beam for flooding the other side of said charge storage member, means for deflecting a sharply defined and focused beam across said storage member, connection means for a source of signals for modulating said focused beam during said deflection to write an electrical charge pattern on said charge storage member, means including said first means for reproducing said charge pattern on said viewing screen, means to increase the intensity of said flooding beam for a certain period to erase the charge pattern on said charge storage member, and means for limiting said flooding beam during said erasure and synchronously therewith to specific areas within the entire display area.

8. A signal storage tube system comprising an electrical storage tube containing a charge storage member, a viewing surface adjacent one side of said charge storage member, means for generating an electron beam for flooding the other side of said charge storage member, means for deflecting a sharply defined and focused beam across said storage member, connection means for a source of signals for modulating said focused beam during said deflection to write an electrical charge pattern on said charge storage member, means including said first means for reproducing said charge pattern on said viewing screen, means to increase the intensity of said flooding beam for a certain period to erase the charge pattern on said charge storage member, an annular electrode through which said flooding beam is directed before impinging on said charge storage member, and means for applying a varying voltage to said annular electrode for changing the cross-sectional area of said flooding beam during said erasure and synchronously therewith.

9. A signal storage tube system comprising an electrical storage tube containing a charge storage member, a viewing surface adjacent one side of said charge storage member, means for generating an electron beam for flooding the other side of said charge storage member, means for deflecting a sharply defined and focused beam across said storage member, connection means for a source of signals for modulating said focused beam during said deflection to write an electrical charge pattern on said charge storage member, means including said first means for reproducing said charge pattern on said viewing screen, means to increase the intensity of said flooding beam during certain intervals for erasing the charge pattern on said charge storage member, a collimating electrode through which said flooding beam is directed before impinging on said charge storage member, and means for applying periodically an increasingly negative voltage to said collimating electrode for changing the cross-sectional area of said flooding beam during said erasure and synchonously therewith.

10. In a plan position type display for a radar system, in combination, a direct view storage tube of the type including a storage screen, a viewing screen adjacent one side of the storage screen, means producing a viewing beam for flooding the other side of said storage screen, means producing a writing beam for producing a charge pattern on said storage means during the application of said viewing beam, and means for periodically increasing the positive potential of said storage screen thereby increasing the intensity of said viewing beam so as to effect erasure of the charge pattern on said storage screen, and means for decreasing the cross-sectional area of said viewing beam during said increase in potential of said storage screen and synchronously therewith thus causing greater erasure in the center portion of the plan position indication than on the outer edges thereof.

11. In combination, a radar system of the type wherein there is to be presented a plan position type display, means for presenting said display comprising a direct view storage tube of the type including a storage screen, a viewing screen adjacent one side of the storage screen, means producing a viewing beam for flooding the other side of said storage screen, means producing a writing beam for producing a charge pattern on said storage means during the application of said viewing beam, and means for periodically increasing the positive potential of said storage screen thereby increasing the intensity of said viewing beam so as to effect erasure of the charge pattern on said storage screen, and means for continuously closing said viewing beam during and in synchronism with the increase in potential of said storage screen thus causing greater erasure in the center portion of the plan position indication than on the outer edges thereof.

12. In combination, a direct-view storage tube including a charge storage member, means for directing a viewing beam at said charge storage member, and a collimating electrode through which said viewing beam passes; means for applying periodic positive pulses to said charge storage member for erasing the same; and means for simultaneously applying to said collimating electrode a periodic signal that is synchronous with said pulses for changing the diameter of said viewing beam.

13. In combination, a direct-view storage tube including a charge storage member, means for directing a viewing beam at said charge storage member, and a collimating electrode through which said viewing beam passes; pulse circuit means coupled to said charge storage member for applying a positive pulse thereto; and circuit means coupled between said pulse circuit means and said collimating electrode for simultaneously applying a wave of the same duration as said pulse to said collimating electrode.

14. In combination, a direct-view storage tube including a charge storage member, means for directing a viewing beam at said charge storage member, and a collimating electrode through which said viewing beam passes; pulse circuit means coupled to said charge storage member for applying a positive pulse thereto; and circuit means coupled between said pulse circuit means and said collimating electrode and responsive to said positive pulse for applying a wave of the same duration to said collimating electrode.

15. In combination, a direct-view storage tube including a charge storage member, means for directing a viewing beam at said charge storage member, and a collimating electrode through which said viewing beam passes; pulse circuit means coupled to said charge storage member for applying a positive pulse thereto; and a circuit coupled to said pulse circuit means for generating a signal having substantially the same duration as said pulse and applying the same to said collimating electrode.

16. In a direct-view storage tube system wherein said tube includes a signal storage electrode, wherein there is means for recurrently writing electrical information on the signal storage electrode, and wherein there is means for producing a flood beam which may be modulated by said written electrical information on said signal storage electrode; the method of erasure which comprises periodically electrically pulsing said storage electrode in a positive direction to provide erasure by said flood beam of said written electrical information and simultaneously and synchronously therewith reducing the diameter of said erasing flood beam.

17. In combination, a direct-view storage tube including a charge storage electrode, means for recurrently writing electrical information on the signal storage electrode, means for producing a flood beam which may be modulated by said written electrical information on said signal storage electrode, means for generating electrical pulses and for utilizing said generated pulses to pulse said storage electrode to provide erasure by said flood beam of said written electrical information, means for generating a periodic signal synchronous with said generated pulses, and means for controlling the diameter of said erasing flood beam as a function of said signal.

References Cited in the file of this patent
UNITED STATES PATENTS

| | | |
|---|---|---|
| 2,456,952 | Kluender | Dec. 21, 1948 |
| 2,798,185 | Hansen | July 2, 1957 |
| 2,856,559 | Knoll | Oct. 14, 1958 |

OTHER REFERENCES

Knoll: "Viewing Storage Tube with Halftone Display," RCA Review, vol. XIV, No. 4, December 1953.